(12) United States Patent
Hensley et al.

(10) Patent No.: US 6,746,178 B1
(45) Date of Patent: Jun. 8, 2004

(54) SEWER DRAIN RECEPTACLE WITH HOSE RESTING SEAT

(76) Inventors: Gerald M. Hensley, P.O. Box 91297, Lakeland, FL (US) 33804; Jerry C. Hensley, P.O. Box 91297, Lakeland, FL (US) 33804

( * ) Notice: Subject to any disclaimer, the term of this patent is extended or adjusted under 35 U.S.C. 154(b) by 0 days.

(21) Appl. No.: 10/307,563

(22) Filed: Dec. 2, 2002

Related U.S. Application Data

(63) Continuation-in-part of application No. 09/928,705, filed on Aug. 13, 2001, now abandoned.

(51) Int. Cl.$^7$ .................................................. F16L 3/00
(52) U.S. Cl. .............................. 405/41; 405/40; 405/36; 138/110
(58) Field of Search .............................. 405/36, 39, 40, 405/41, 42, 52, 53; 138/109, 110

(56) References Cited

U.S. PATENT DOCUMENTS

| | | | | |
|---|---|---|---|---|
| 5,023,959 A | * | 6/1991 | Mercer | 138/121 |
| 5,323,813 A | * | 6/1994 | Barrett | 137/899 |
| 5,417,460 A | * | 5/1995 | Lunder | 285/253 |
| 5,904,183 A | * | 5/1999 | Leech | 138/110 |
| 6,240,986 B1 | * | 6/2001 | Berkes et al. | 141/346 |
| 6,352,088 B1 | * | 3/2002 | Stegall | 141/1 |

* cited by examiner

*Primary Examiner*—Frederick L. Lagman
(74) *Attorney, Agent, or Firm*—George A. Bode; Lisa D. Velez; Bode & Associates

(57) ABSTRACT

A sewage drain receptacle for underground sewage systems for campgrounds or RV parks that includes a hose resting seat coupled to the top orifice of a drain line and a sewage cap for closing the top orifice. The hose resting seat extends along a portion of the length of the drain line and serves to cradle a bottom of a sewage hose so that it is prevented from being lodged into the sewage system.

15 Claims, 2 Drawing Sheets

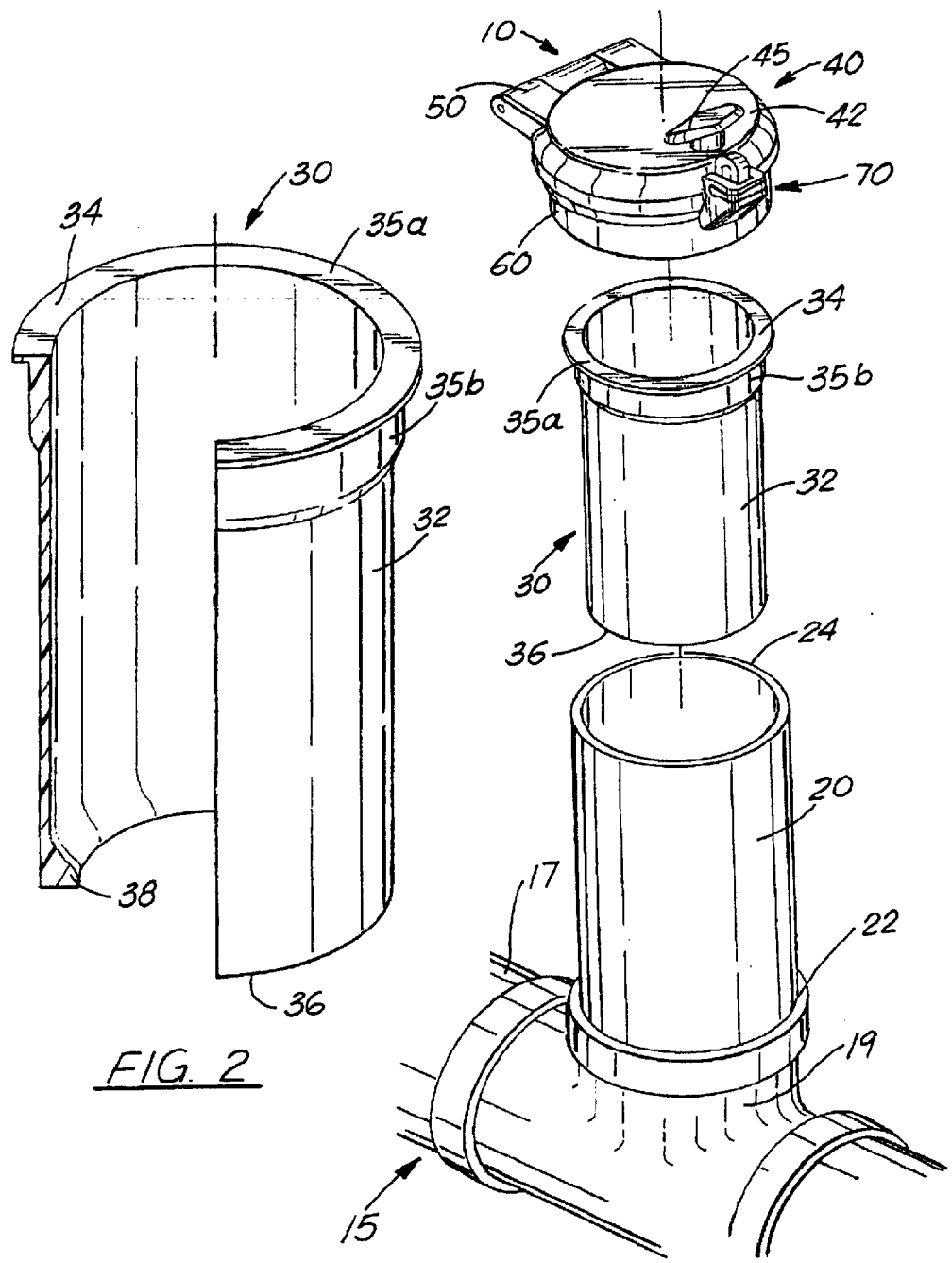

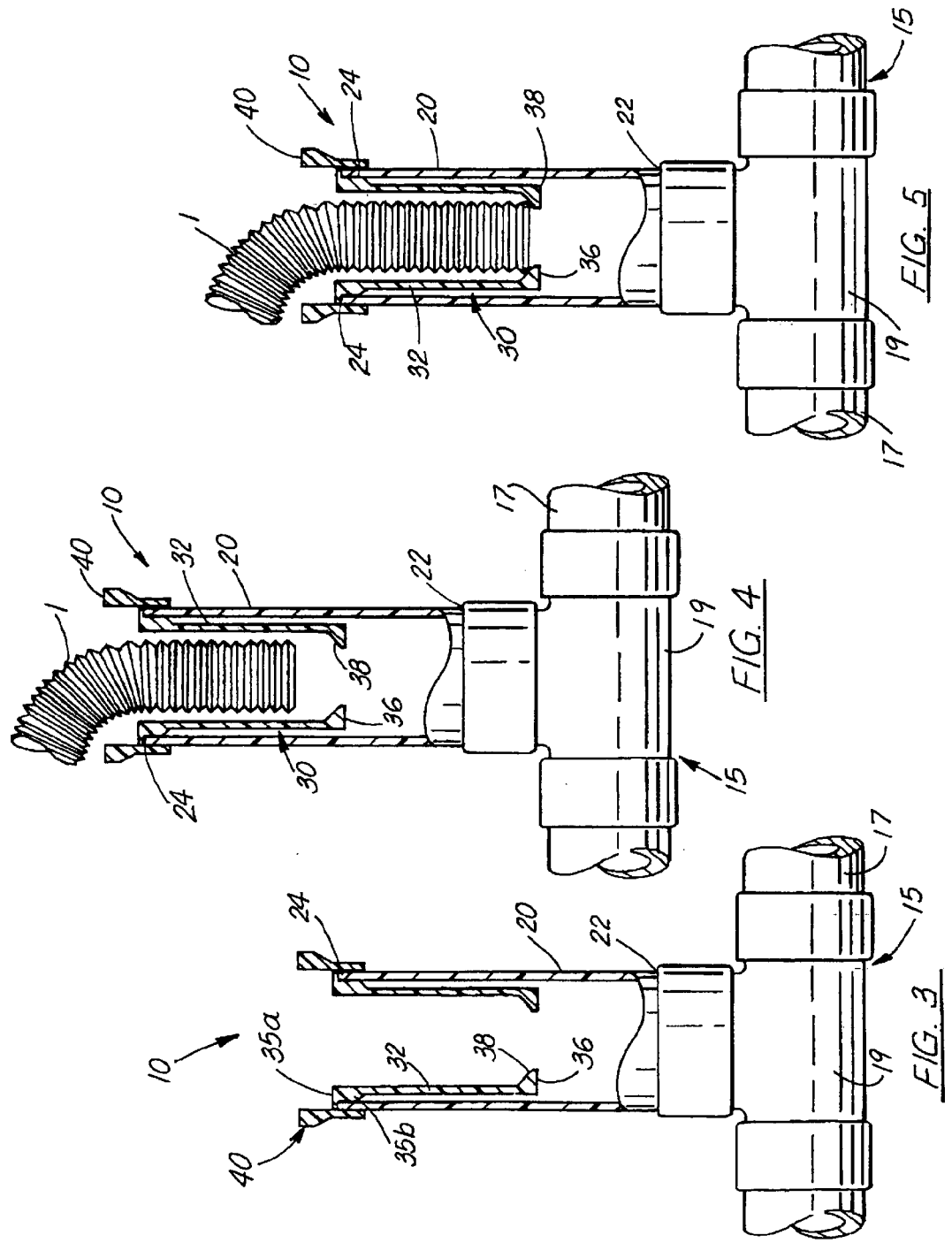

SEWER DRAIN RECEPTACLE WITH HOSE RESTING SEAT

CROSS-REFERENCE TO RELATED APPLICATIONS

This application is a continuation-in-part of a previous application by the same inventors bearing U.S. Ser. No. 09/928,705, filed Aug. 13, 2001, now abandoned, and entitled "Sewer Cap Device Having Sealing Means And Locking Means." The entirety of this previous application is incorporated herein by reference as if set forth in full below.

BACKGROUND OF THE INVENTION

1. Field of the Invention

The present invention relates to sewage systems for campgrounds and parks for recreational vehicles (hereinafter referred to as "RV parks") and, more particularly, to a sewer drain receptacle coupled to the sewage system, for use in RV parks, that includes a hose resting seat for cradling the RV's hose to prevent the loss of an RV hose or obstruction within the sewer line.

2. General Background

Recreational vehicles (hereinafter referred to as "RVs") are equipped with sewer kits to evacuate the sewage from the RV to a sewage system of a campground or other RV sewage dumping stations. There are a variety of RV sewer kit manufactures some of which produce a sewer kit unique to their design.

For example, the Camping World, Inc. Catalogue @ Page 54 illustrates, one known sewer kit, the Easy Slip® Ready-To-Use RV Sewer Kit. Such kit includes a heavy-duty sewer hose, an Easy Slip® bayonet straight hose adapter and an Easy Slip® elbow with a 4-in-1 adapter. The 4-in-1 adapter includes a multi-tiered externally threaded sections wherein each section has a different circumference. The top section has the largest circumference; the middle section has a circumference which is small than the top section; and the lower section has a circumference with is the smallest. Below the lower section, the 4-in-1 adapter further includes a hollow tubular member having an external surface which is not generally threaded. As can be appreciated, the 4-in-1 adapter is designed to be accommodated by a variety of campground sewer systems.

Other manufactures include Valterra which manufactures a variety of couplers, adapters and valves which can be sold as a kit or system to accommodate for the different requirements of the campground sewage systems. For example, some campgrounds require only a simple press fit connection between the RV's sewage hose and the sewer cap of the campground while other campgrounds require threaded connections.

However, one of the problems with the hook-up of the RV hose to the sewer drain receptacle in the ground is that the RV hose can become detached and lodged into the sewage system. Thus, the sewage in the underground sewage system can become obstructed by the presence of a lost RV hose.

As will be seen more fully below, the present invention is substantially different in structure, methodology and approach from that of the prior systems providing sewage drain receptacles for underground sewage systems in campgrounds or RV parks.

SUMMARY OF THE PRESENT INVENTION

The preferred embodiment of the sewage drain receptacle of the present invention solves the aforementioned problems in a straight forward and simple manner.

Broadly, the present invention contemplate a sewage drain receptacle for underground sewage systems for campgrounds or RV parks comprising: a hose resting seat coupled to the top orifice of a sewage drain line and which extends along a portion of the length of the drain line for cradling a bottom of a sewage hose. Thereby, the sewage hose is prevented from becoming lodged in the sewage system.

The present invention further contemplates a sewage drain receptacle with a sewage drain cap for closing the top orifice of the sewage drain line.

In view of the above, an object of the present invention is to provide a tamper-proof sewage cap which provides a good water-tight and odor-tight cap device.

A further object of the present invention is to provide a hose resting seat that is adapted to accommodate a variety of RV hoses and their couplers to the sewage system.

In view of the above, a feature of the present invention is to provide a hose resting seat and tamper-proof sewage cap which are simple to install.

The above and other objects and features of the present invention will become apparent from the drawings, the description given herein, and the appended claims.

BRIEF DESCRIPTION OF THE DRAWING

For a further understanding of the nature and objects of the present invention, reference should be had to the following description taken in conjunction with the accompanying drawings in which like parts are given like reference numerals and, wherein:

FIG. 1 is an exploded view of the sewage system with a sewage drain receptacle in accordance with the preferred embodiment of the present invention;

FIG. 2 is partial view of the hose resting seat of the embodiment of FIG. 1;

FIG. 3 is a cross-sectional view of the sewage system with a sewage drain receptacle of the embodiment of FIG. 1;

FIG. 4 is a cross-sectional view of the sewage system with a sewage drain receptacle of the embodiment of FIG. 1 with a RV hose being inserted; and, FIG. 5 is a cross-sectional view of the sewage system with a sewage drain receptacle of the embodiment of FIG. 1 with the RV hose being seated in the seat.

DETAILED DESCRIPTION OF THE PREFERRED EMBODIMENT

Referring now to the drawings and in particular FIGS. 1–5, the sewage drain receptacle of the present invention is generally referenced by the numeral 10. The sewage drain receptacle 10 is part of an underground sewage system 15 for campgrounds and RV parks and serves as the conduit through which sewage or the like can be emptied. The underground sewage system 15 comprises at least one sewage drain receptacle 10 and typically includes many such drain receptacles 10 dispersed about the campground or RV park.

The sewage drain receptacle 10 includes a drain conduit member 20 or drain line having one free end 22 coupled to a sewage transport line 17 of the underground sewage system 15 for the communication of sewage therebetween. The other free end 24 (or the top orifice) of the drain conduit member 20 has coupled thereto a hose resting seat 30, which extends along at least a portion of the length of the drain conduit member 20. Additionally, the other free end 24 of the drain member 20 has coupled thereto a sewage cap device 40 which closes the top orifice of the drain conduit member 20 and hose resting seat 30.

In the exemplary embodiment, the drain conduit member 20 is coupled to the sewage transport line 17 via a T-coupler 19.

Referring now to the hose resting seat 30, the hose resting seat 30 includes a tubular member 32 concentric with the tubular structure of the drain conduit member 20. One free end 34 (or top rim) of the hose resting seat 30 is secured to the other free end 24 (or the top orifice) of the drain conduit member 20. The other free end 36 of the hose resting seat 30 includes an annular flange or brim 38 extending around the inner circumference of the tubular member 32. The annular flange or brim 38 reduces the inner circumference at the lower distal end of tubular member 32 to provide a "seat" to rest an RV hose 1 and limit the distance the RV hose 1 can fall into the drain conduit member 20. Thereby, the "seat" at the lower distal end of tubular member 32 serves to prevent the RV hose 1 from possibly falling further into the sewage drain receptacle 10.

Referring now to FIGS. 4 and 5, the distance the RV hose 1 will travel in the drain conduit member 20 is limited by the location of the "seat" of tubular member 32 in drain conduit member 20. While the "seat" can be located at any desired distance, the "seat" should be located at a distance to accommodate the lengths of currently manufactured RV hoses 1. Moreover, the "seat" serves to prevent the RV hose 1from extending down into the sewage transport line 17 of the underground sewage system 15 so that the flow of sewage is not blocked or obstructed.

The free end 34 (or top rim) of the hose resting seat 30 includes an annular rim 35a that secures the free end 34 to the drain conduit member 20. The free end 34 further includes a distancing ring 35b integral with the tubular member 32 and which is substantially in direct surface-to-surface contact with the inner circumferential surface of the drain conduit member 20. The distancing ring 35b serves to stabilize and essentially centrally locate the tubular member 32 within the drain conduit member 20.

Referring still to FIG. 2, while FIG. 2 is a partial view illustrating features of the hose resting seat 30, it should be noted that the hose resting seat 30 may have a portion of the tubular member 32 removed so that the tubular member 32 can flexibly stretch to accommodate a large RV hose 1.

An exemplary sewage cap device 40 is disclosed in our parent U.S. patent application Ser. No. 09/928,705, filed Aug. 13, 2001, and entitled "Sewer Cap Device Having Sealing Means And Locking Means," which is incorporated herein by reference as if set forth in full hereinbelow. The sewage cap device 40 is a tamper-proof sewage cap device comprised of a hingedly coupled cap or lid member 42 which rotates about hinge assembly 50 coupled to one side of the base coupler 60 to an open position to permit an RV's hose coupler 1 to be attached thereto to evacuate the sewage from the RV (NOT SHOWN) to the underground or campground sewage system 15. The hingedly coupled cap or lid member 42, when closed is adapted to be locked in a closed position via a locking assembly 70.

In the exemplary embodiment, the locking assembly 70 is coupled approximately 90 degrees or on a side opposite from the hinge assembly 50. Furthermore, the locking assembly 70 is constructed and arranged for use of a pad lock (NOT SHOWN) to lock the hingedly coupled cap or lid member 42.

The tamper-proof sewage cap device 40 further comprises a top-mounted lid handle 45 constructed and arranged for grasping by at least one finger or a hand to lift the hingedly coupled cap or lid member 42 when the it is unlocked. As the hingedly coupled cap or lid member 42 is lifted, the hingedly coupled cap or lid member 42 pivots or rotates about the hinge assembly 50.

More importantly, the top-mounted lid handle 45 is a quick and easy means for grasping to rotate the hingedly coupled cap or lid member 20 to a fully open position. When the hingedly coupled cap or lid member 42 is in a fully open position, the top-mounted lid handle 45 is protected by the underside of the hingedly coupled cap or lid member 42 to minimize sewage contamination during the connection and disconnection of the RV's hose 1.

The base coupler 60 is adapted to be secured in the sewage hole of a campground or RV park. The outer perimeter surface is affixed to the ground via grout or cement and such that the base coupler 60 is essentially flush-mounted with the ground.

The hingedly coupled cap or lid member 42 is designed to create a tight fit or seal with the base coupler 60, when the hingedly coupled cap or lid member 42 is closed. Hence, this arrangement provides a good odor-tight and water-tight tamper-proof sewage cap device 40 when the hingedly coupled cap or lid member 20 is closed.

In the exemplary embodiment, the tamper-proof sewage cap device 40 is adapted to be coupled (such as by welding, cementing, glueing, etc.) to the exterior surface of the drain conduit member 20. Nevertheless, the tamper-proof sewage cap device 40 can be coupled to the annular rim 35a.

It should be noted that the tamper-proof sewage cap device 40 and the hose resting seat 30 may be integrally formed and secured to the drain conduit member 20. Alternately, the drain conduit member 20, the tamper-proof sewage cap device 40 and the hose resting seat 30 may be integrally formed together which is a convenient design when installing a new underground sewage system. Finally, the receptacle 10 may simple include the hose resting seat 30 and the sewage cap 40 when retrofitting the existing sewage drain lines with receptacle 10.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A sewage drain receptacle for underground sewage systems for campgrounds or RV parks comprising:
   a drain conduit member having a free end coupled to a sewage transport line of the underground sewage system for the communication of sewage therebetween and a top orifice; and
   a hose resting seat coupled to the top orifice and which extends along a portion of a length of the drain conduit member for cradling a bottom of a sewage hose, said hose resting seat further comprising:
   a tubular member having a top distal end and a lower distal end; and,
   an annular flange protecting inward from the lower distal end to narrow the circumference of the tubular member and forming a seat for the sewage hose.

2. The receptacle of claim 1, further comprising
   a T-coupler for coupling the drain conduit member to the sewage transport line.

3. The receptacle of claim 1, wherein the hose resting seat further comprises:

a spacing ring coupled to an outer perimeter wall of the tubular member for distancing the tubular member in the drain conduit member.

4. The receptacle of claim 1, further comprising:
a sewage cap device for closing the top orifice of the drain member.

5. The receptacle of claim 4, wherein the sewage cap is a tamper-proof sewage cap adapted to be mounted flush with the ground.

6. The receptacle of claim 5, wherein the sewage cap comprises:
a base coupler adapted to be mounted in the ground and flush therewith;
a lid member;
a hinge assembly coupled to one side of said base coupler and to the lid member; and,
a locking assembly which locks said lid member to said base coupler.

7. The receptacle of claim 6, wherein:
the sewage cap further comprises:
a top mounted handle coupled to the lid member and dimensioned for grasping by at least one finger or a hand; and
said lid member forms a tight seal with said base coupler when said lid member is closed.

8. A sewage drain receptacle for underground sewage systems for campgrounds or RV parks comprising:
means for cradling a bottom of the sewage hose which is coupled to a top orifice of a sewage drain line and which extends along a portion of a length of the sewage drain line, said hose cradling means comprising:
a tubular member having a top distal end and a lower distal end; and,
a annular flange projecting inward from the lower distal end to narrow the circumference of the tubular member and forming a seat for the sewage hose; and,
means for closing the top orifice of the sewage drain line.

9. The receptacle of claim 8, wherein the hose cradling means further comprises:
a spacing ring coupled to an outer perimeter wall of the tubular member for distancing the tubular member in the sewage drain line.

10. The receptacle of claim 8, wherein the closing means comprises:
a base coupler adapted to be mounted flush with the ground;
a lid member;
a hinge assembly coupled to one side of said base coupler and to the lid member; and,
a locking assembly which locks said lid member to said base coupler.

11. The receptacle of claim 10, wherein the closing means further comprises:
a top mounted handle coupled to the lid member and dimensioned for grasping by at least one finger or a hand.

12. An underground sewage system for campgrounds or RV parks comprising:
a sewage transport line;
at least one sewage drain line having a top orifice;
at least one sewage drain receptacle coupled to the at least one sewage drain line, the at least one sewage drain receptacle comprising:
a hose resting seat coupled to the top orifice and which extends along a portion of a length of the at least one sewage drain line for cradling a bottom of a sewage hose, said hose resting seat comprising:
a tubular member having a top distal end and a lower distal end; and,
an annular flange projecting inward from the lower distal end to narrow the circumference of the tubular member and forming a seat for the sewage hose; and,
a T-coupler for coupling the at least one sewage drain line to the sewage transport line.

13. The system of claim 12, wherein the hose resting seat further comprises:
a spacing ring coupled to an outer perimeter wall of the tubular member for distancing the tubular member in the sewage drain line.

14. The system of claim 12, further comprising a sewage cap device for closing the top orifice of the drain line that is tamper-proof and adapted to be mounted flush with the ground.

15. The system of claim 14, wherein the sewage cap comprises:
a base coupler adapted to be mounted flush with the ground;
a lid member;
a hinge assembly coupled to one side of said base coupler and to the lid member; and,
a locking assembly which locks said lid member to said base coupler.

* * * * *